United States Patent [19]

Empie

[11] Patent Number: 5,545,292

[45] Date of Patent: Aug. 13, 1996

[54] KRAFT SMELT SOLIDIFICATION IN A FLUIDIZED BED REACTOR

[75] Inventor: H. Jeff Empie, Acworth, Ga.

[73] Assignee: Institute of Paper Science and Technology, Inc., Atlanta, Ga.

[21] Appl. No.: 303,614

[22] Filed: Sep. 9, 1994

[51] Int. Cl.$^6$ ................................................ D21C 11/04
[52] U.S. Cl. ................ 162/30.11; 162/30.1; 162/68; 422/164; 422/185
[58] Field of Search ........................ 162/30.1, 30.11, 162/68; 422/185, 139, 164; 110/245; 48/209; 423/DIG.3

[56] References Cited

U.S. PATENT DOCUMENTS

| | | | |
|---|---|---|---|
| 4,303,469 | 12/1981 | DiNovo et al. | 162/30 R |
| 4,441,959 | 4/1984 | Empie, Jr. | 162/30.1 |
| 4,522,685 | 6/1985 | Feldmann | 162/30.11 |
| 4,526,760 | 7/1985 | Empie, Jr. | 422/185 |
| 5,284,550 | 2/1994 | Tanca et al. | 162/31 |

OTHER PUBLICATIONS

Nishizawa et al., "Chemical recovery process by direct carbonation of smelt", Proc. IUPAC/EUCEPA Symp. on Recovery of Pulping Chems, Helsinki, pp. 659–673 (1968).
Rapson, "Paper", McGraw–Hill Eng. . , Sci. & Tech., vol. 13, (1986).
Grace, "Gasification: Route to the promised land?", PIMA, Jun. 1988.
Empie, "Alternative kraft recovery processes", *Tappi Journal*, May 1991, pp. 272–276.
Empie, "Improved Energy Efficacy and Safety in Smelt Dissolving Through Smelt Solidification," Tappi Engineering Conference, Orlando, Florida Sept 23, 1993.
Proxmire, "Heat Recovery from Smelt", May 18, 1984 (A2000 Preparation for Research Problem).

Primary Examiner—Donald E. Czaja
Assistant Examiner—Dean T. Nguyen
Attorney, Agent, or Firm—Fitch, Even, Tabin & Flannery

[57] ABSTRACT

An improved black liquor recovery system for use in a kraft pulping mill is provided. Molten kraft smelt from a black liquor recovery boiler or recovery system is fed into a fluidized bed reactor where it is cooled and solidified to form solid kraft smelt particles. The solid kraft smelt particles are then fed into a dissolving tank containing an aqueous solution to form a green liquor. The green liquor, after clarification, is treated with lime to form a white liquor containing the regenerated pulping chemicals. Waste steam is an especially preferred fluidizing gas for use in the fluidized bed reactor. This process provides improved energy recovery and process productivity, reduction in gaseous sulfur-containing emissions, reduction in landfilled wastes, and improved safety as compared to a conventional kraft smelt treatment process.

26 Claims, 1 Drawing Sheet

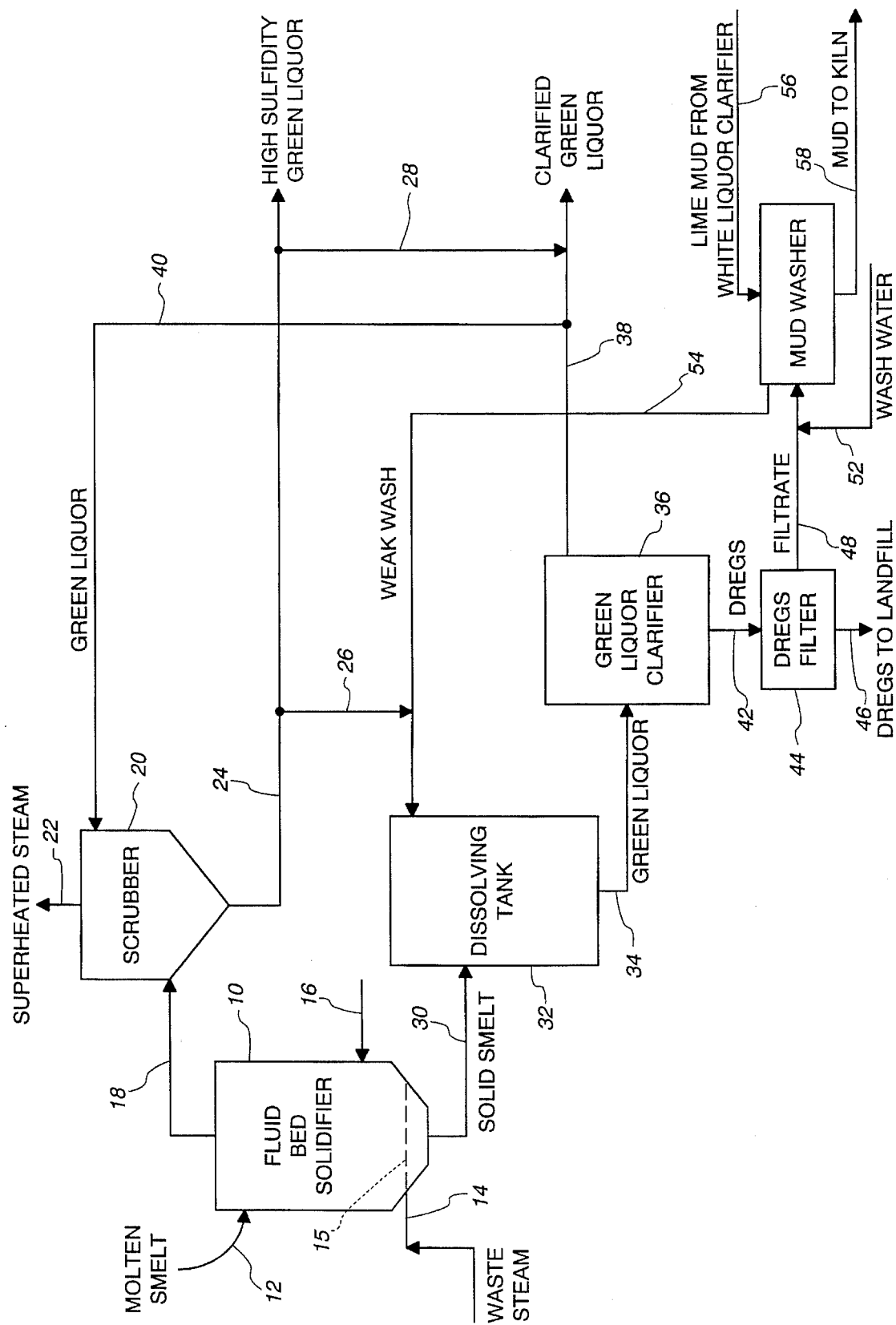

KRAFT SMELT SOLIDIFICATION IN A FLUIDIZED BED REACTOR

FIELD OF THE INVENTION

This invention generally relates to a method for the treatment of molten kraft smelt in a kraft recovery process. More specifically, this invention relates to a method whereby molten kraft smelt is solidified in a fluidized bed and the resulting solidified kraft smelt is then contacted with an aqueous solution in a dissolving tank to form kraft green liquor. The present invention allows for a kraft recovery process which is cheaper, safer, more energy efficient, and easier to control than existing kraft recovery processes. The present method allows for recovery of a significant portion of the heat energy associated with the molten kraft smelt. In addition, emissions of sulfur-containing compounds or pollutants normally associated with the kraft smelt dissolving operation are significantly reduced.

BACKGROUND OF THE INVENTION

The kraft process is generally the most widely used chemical pulping process employed in the paper-making industry. In this process, wood chips or other fibrous materials are heated under pressure with steam in a sodium hydroxide and sodium sulfide solution. The resulting pulp is generally used to make brown paper. It can also be bleached to produce white pulp for writing and other higher grade papers.

The filtrate and washings from the pulping process—the so-called black liquor—generally contain dissolved organic materials from the wood as well as spent pulping chemicals. The black liquor is normally concentrated in evaporators and then burned under both oxidizing and reducing conditions in a boiler or combustor. The combustion of the organic matter contained in the black liquor produces high pressure steam which can be used to generate electricity. The inorganic materials form a molten kraft smelt on the bottom of the combustor. This kraft smelt generally contains sodium carbonate, sodium sulfide, and sodium sulfate. The molten kraft smelt, generally at a temperature of about 1400° to 1550° F., is normally removed from the bottom the combustor via a water-cooled trough (the so-called smelt spout) and fed directly into an aqueous solution contained in a dissolving tank. Thus, the kraft smelt is fed into the dissolving tank while still in the molten state. The kraft smelt dissolves in the aqueous solution and produces a so-called green liquor. The green liquor, after filtering or clarifying to remove undissolved materials, is treated with lime to convert the sodium carbonate into sodium hydroxide through slaking and causticizing reactions. In the slaking reaction, calcium oxide is converted to calcium hydroxide; in the causticizing reaction, the calcium hydroxide reacts with sodium carbonate to produce calcium carbonate and sodium hydroxide. This lime-treatment process produces kraft white liquor containing the pulping chemicals which can then be reused or recycled in the kraft pulping system.

This chemical recovery system forms an important and vital part of the paper-making process. Indeed, without the chemical recovery system, the kraft system would be prohibitively expensive. Moreover, the disposal of the black liquor would likely be impossible in an environmentally acceptable manner. This chemical recovery process or system has, however, a number of problems and/or limitations. For example, feeding molten kraft smelt (normally about 1400° F. or higher) directly into an aqueous solution can result in, and often has resulted in, explosions in the dissolving tank. Such explosions, in addition to potentially damaging equipment and injuring personnel, can release significant amounts of sulfur-containing pollutants into the environment, especially into the atmosphere. In addition, this process results in a significant energy loss due to loss of atmospheric steam escaping from the dissolving tank. Moreover, it is difficult to control the green liquor concentration when feeding molten kraft smelt. Finally, emissions of sulfur-containing pollutants from the dissolving tank, even in the absence of smelt/water explosions, are significantly higher than desired.

Considerable efforts have been made to improve the existing kraft recovery process or to provide alternative kraft recovery processes. See, for example, Nishizawa et al., "Chemical Recovery Process by Direct Carbonation of Smelt," Proc. IUPAC/EUCEPA Symposium on Recovery of Pulping Chemicals (Helsinki) 659–73 (1968); Grace, "Gasification: Route to the Promised Land?", 70 *PIMA* 75–76 (1988); Empie, "Alternative Kraft Recovery Processes," 74 *Tappi J.* 272–76 (1991); DeNovo et al., U.S. Pat. No. 4,303,496 (Dec. 1, 1981); Empie, U.S. Pat. No. 4,441,959 (Apr. 10, 1984); Feldmann, U.S. Pat. No. 4,522,685 (Jun. 11, 1985); and Empie, U.S. Pat. No. 4,526,760 (Jul. 2, 1985). Although the overall process has been improved in a number of ways, the kraft recovery process generally employed today still involves feeding molten kraft smelt directly into an aqueous solution in the dissolving tank.

It would be desirable, therefore, to provide a kraft recovery system which avoids direct contact of the molten kraft smelt with water. Such a system would have a significantly reduced risk of smelt/water explosions. It would also be desirable to provide a kraft recovery system with significantly increased energy efficiencies. It would also be desirable to provide a kraft recovery system with significantly reduced levels of sulfur-laden emissions. It would also be desirable to provide a kraft recovery system which allows better and more reproducible control of the green liquor concentration. The present invention provides such a kraft recovery system. Moreover, the kraft recovery system provided by the present invention can be incorporated into existing kraft recovery systems with relative ease.

SUMMARY OF THE INVENTION

The present invention generally relates to improved methods for recovering energy and chemical values in a kraft recovery system. More specifically, molten kraft smelt from a black liquor system is fed into a fluidized bed wherein the molten kraft smelt is cooled and solidified. The cooled and solidified kraft smelt is withdrawn from the fluidized bed and introduced into a green liquor dissolving tank. Operation of the present invention allows for increased energy efficiencies, increased safety, increased control of the green liquor concentrations and decreased sulfur-laden emissions as compared to conventional kraft recovery systems. The improved kraft recovery system of the present invention can easily be integrated into conventional kraft recovery systems producing green liquor. Although this present invention can be used in a batch mode, it is ideally suited for use in semi-continuous or continuous operating black liquor recovery systems.

One object of the present invention is to provide a process for treatment of molten kraft smelt in a kraft recovery process, said process comprising (1) feeding molten kraft smelt from a black liquor recovery system to a fluidized bed reactor containing particulate solids fluidized with a non-oxidizing fluidizing gas, wherein the fluidized bed reactor is operated at a temperature of about 600° to 900° F.;

(2) solidifying the molten kraft smelt within the fluidized bed reactor to form solid kraft smelt particles;

(3) removing the solid kraft smelt particles from the fluidized bed reactor; and (4) feeding the solid kraft smelt particles to a dissolving tank containing an aqueous solution whereby a kraft green liquor is formed.

Another object of the present invention is to provide a continuous process for treatment of molten kraft smelt in a kraft recovery process, said process comprising (1) continuous feeding molten kraft smelt from a black liquor recovery system to a fluidized bed reactor containing particulate solids fluidized with a non-oxidizing fluidizing gas, wherein the fluidized bed reactor is operated at a temperature of about 600° to 900° F.;

(2) solidifying the molten kraft smelt within the fluidized bed reactor to form solid kraft smelt particles;

(3) removing the solid kraft smelt particles from the lower portion of the fluidized bed reactor; and (4) feeding the solid kraft smelt particles removed from the fluidized bed reactor to a dissolving tank containing an aqueous solution whereby a kraft green liquor is formed, wherein the solid smelt particles are introduced sufficiently below the surface of the aqueous solution so that essentially all gaseous sulfur-containing compounds liberated upon introduction of the solid smelt particles are absorbed in the aqueous solution;

wherein the relative rates of molten kraft smelt fed into the fluidized reactor and solid kraft smelt particles removed from the fluidized bed reactor are adjusted to achieve an essentially steady state operation.

Still another object of the present invention is to provide an integrated process for the recovery of pulping chemicals from black liquor from a kraft pulping mill, said process comprising (1) burning black liquor from a kraft pulping mill in a boiler to produce high pressure steam;

(2) collecting molten kraft smelt from the bottom of the boiler;

(3) feeding the molten kraft smelt into a fluidized bed reactor containing a particulate substrate fluidized with a non-oxidizing fluidizing gas and operated at a temperature at least 100° F. below the melting point of the molten kraft smelt, whereby the molten kraft smelt cools and solidifies upon contact with the fluidized particulate substrate to form solid kraft smelt particles;

(4) removing the solid kraft smelt particles from the fluidized bed reactor;

(5) feeding the solid kraft smelt particles to a dissolving tank containing an aqueous solution at about 180° to 205° F. to form a kraft green liquor, wherein the solid kraft smelt particles are fed at a sufficient depth below the surface of the aqueous solution so that steam and volatile sulfur-containing compounds are recondensed and reabsorbed in the aqueous solution;

(6) clarifying the kraft green liquor by removing dregs; and (7) treating the clarified kraft green liquor with lime to form a kraft white liquor containing the pulping chemicals.

These and other objects and advantages of the present invention will be apparent from a consideration of the present specification and drawing.

DESCRIPTION OF THE DRAWING

The FIGURE illustrates the process of the present invention for treatment of molten kraft smelt to form clarified green liquor. The molten kraft smelt is cooled and solidified in a fluidized bed using waste steam as the fluidizing gas; the cooled and solidified kraft smelt is then dissolved in the dissolving tank to form green liquor which is then clarified. The clarified green liquor can be treated in a conventional manner with lime (i.e., slaking and causticizing reactions; not shown) to form white liquor containing the regenerated pulping chemicals which then can be recycled in the kraft pulping process.

DETAILED DESCRIPTION OF THE INVENTION

This present invention relates to a method of treating molten kraft smelt in a kraft pulping process to recover both energy and chemical values with increased efficiencies, increased safety, and reduced impact on the environment. Molten kraft smelt directly from a black liquor recovery boiler or other black liquor recovery system is cooled and solidified in a fluidized bed reactor using a non-oxidizing fluidizing gas. The temperature of the molten kraft smelt entering the fluidized bed should, of course, be above its melting point. The actual melting point of kraft smelt is highly dependent on its composition; for a typical smelt containing about 25 weight percent sodium sulfide and about 75 weight percent sodium carbonate, the melting point is about 1300° F. Preferably, the molten kraft smelt entering the fluidized bed reactor is in the range of about 1350° to 1550° F., and more preferably about 1400° to 1500° F. Molten kraft smelt directly from a conventional black liquor recovery boiler can be treated by the method of this invention. In addition, molten kraft smelt from alternative black liquor treatment processes can also be treated using the methods of this invention. For example, molten kraft smelt from the integrated spent liquor recovery process or processes described in U.S. Pat. Nos. 4,303,496, 4,441,959, 4,522,685, and 4,526,760, all of which are hereby incorporated by reference, or molten kraft smelt from the molten salt gasification process developed by Rockwell International and Champion International can be treated with the process of this invention.

Heat energy transferred to the fluidized gas can be employed, and preferably is employed, for useful work within the kraft pulping process. When waste steam is used as the fluidizing gas, the heated steam exiting the fluidizing bed reactor can be converted to or used as superheated steam for use throughout the process. Alternatively, the heated fluidizing gas from the fluidizing bed reactor can be used to supply heat directly to other parts of the process. In order to increase reaction efficiencies in downstream operation units (see FIGURE), it is generally preferred that the fluid bed reactor be operated at a temperature of about 600° to 900° F., more preferable at about 600° to 750° F., and more preferable at about 700° F.

The fluidized bed contains particulate solids maintained in a fluidized state with a non-oxidizing fluidizing gas. The molten kraft smelt is introduced into the fluidized bed reactor, preferably into the central portion of the fluidized bed reactor, where it is cooled and solidified by contacting the fluidized bed material or substrate and the fluidizing gas, whereby solid, particulate kraft smelt is obtained. The initial fluidized bed material or substrate can consist of essentially any inert, particulate solid having a melting point above the operating temperature of the fluidized bed reactor. Examples of such substrate materials include sand, Speculite, water insoluble salts, ground-up solid kraft smelt, and the like. The preferred substrate material is ground-up solid kraft smelt. Other substrate materials (i.e., other than ground-up solid kraft smelt) will be purged from the fluidized bed reactor as the cooled and solidified kraft smelt particles are removed from the fluidized bed reactor for further treatment. Thus, after start up of the fluidized bed reactor and during continuous operation, the substrate material will be converted to solid kraft smelt particles regardless of the substrate material used for the initial start up. Such purged substrate materials from the start up will generally be removed with the dregs from the green liquor clarifier and will normally be sent with the dregs to a suitable landfill. Use of ground up solid kraft smelt during start up will, therefore, reduce the quantity of landfilled materials since such substrate material, along with the solid kraft smelt formed in the fluidized bed, will be converted to green liquor in the dissolving tank. Generally, the particle size of the substrate material used for start up will be in the range of about 0.1 to 1.0 mm. During operation, the particle size of the substrate material will generally remain within this same range.

The fluidizing gas can be any non-oxidizing gas so long as it is essentially non-reactive with the kraft smelt material (i.e., does not convert the sodium sulfide present in the kraft smelt to sodium sulfate or thiosulfate to an appreciable degree). Suitable inert gases include nitrogen, argon, essentially oxygen-free steam, and the like. The preferred fluidizing gas is essentially oxygen-free steam. For purposes of this invention, "essentially oxygen-free steam" is steam which does not oxidize the kraft smelt to any appreciable degree. Preferably, such "essentially oxygen-free steam" contains less than about 1 ppm oxygen. Waste or low-grade steam from other portions of the kraft pulping facility can be used as the fluidizing gas. In fact, such waste steam, because of its increased temperature from passage through the fluidized bed, can be (and preferably is) "cleaned up" in a conventional scrubber and then treated as superheated steam for further use in the kraft pulping facility, thereby significantly reducing the amount of waste vent or off-gases released to the atmosphere. Thus, such recycling of waste steam as the fluidizing gas can significantly reduce the amount of sulfur-containing pollutants released to atmosphere. The velocity of the fluidizing gas in the fluidized bed reactor should be controlled so as to fluidize the substrate material without excessive entrainment of the substrate material in the overheads going to the scrubber. Generally, a fluidization velocity of about 5 to 50 ft/sec is acceptable with a substrate particle size of about 0.1 to 1.0 mm. Lower or higher velocities can be used so long as an acceptable fluidized bed is obtained.

The molten kraft smelt, upon entering the fluidized bed reactor, will tend to "coat" or plate out on the fluidized substrate material thereby increasing the particle size of the substrate material. In effect, the molten kraft smelt entering the fluidized bed reactor "sees" a relatively cool bed particle, coats it, and then solidifies by giving up its latent heat and some of its sensible heat. By this coating and cooling mechanism, the particle size of the substrate material will tend to grow. In addition, large particles can also break up due to the action of the fluidized bed to form two or more smaller sized particles which can then be coated with molten kraft smelt and grow into larger particles once again. Larger substrate particles will tend to move towards the lower portions of the fluidized bed reactor where they can be removed using conventional solid handling equipment for transport to the dissolving tank. Generally the substrate material in the fluidized bed reactor will be in the range of about 0.1 to 1.0 mm. Particles smaller than this range can be contained in the fluidized bed so long as entrainment of the smaller particles by the fluidizing gas is not excessive; and particles greater than this range can also be included so long as they can be fluidized. By adjusting the input rate of molten kraft smelt into the fluidized bed reactor and the removal rate of solid kraft smelt particles from the fluidized bed reactor, a steady state operation of the fluidized bed can be realized.

Because of the excellent heat transfer efficiencies and significantly higher interfacial area per unit volume associated with fluidized bed reactors, such a fluidized bed reactor is ideally suited for use in a kraft recovery system as described herein. For example, a typical paper mill operating at about 1000 tons/day would produce about 630 tons/day of molten kraft smelt. A single fluidized bed reactor having an height of about 10 to 20 feet and a diameter of about 8 to 10 feet would be sufficient to treat the molten kraft smelt from such mill. Alternatively, several smaller fluidized bed reactors could be used in parallel to treat the molten kraft smelt from such a mill. Of course, larger fluidized bed reactors can also be used. Such a larger fluidized bed reactor might, for example, be used to treat kraft smelt from multiple black liquor boilers. In any event, the fluidized bed reactors required are of reasonable size and capital expense. In some cases, it may be preferred to use several fluidized bed reactors in place of a single, larger fluidized bed reactor. In that case, it will not be necessary to shut down the black liquor recovery system or stockpile the kraft smelt should it become necessary or desirable to shut down one of the fluidized bed reactors for routine maintenance or other repairs.

The solid kraft smelt particles removed from the fluidized bed reactor are introduced into an aqueous solution contained in the dissolving tank in order to dissolve the solid kraft smelt in water, thereby forming green liquor. Generally it is preferred that the temperature of the solid kraft smelt particles fed into the dissolving tank is sufficiently high so as to keep the green liquor so formed at about 180° to 205° F., more preferably at about 190° to 200° F., and even more preferably at about 200° F. Generally, operating the fluidized bed reactor at about 600° to 750° F. will provide solid kraft smelt particles at a sufficiently high temperature to maintain the green liquor within the desired temperature range. The green liquor is then clarified in the green liquor clarifier, preferably operated at about 180° to 200° F., and more preferably at about 190° F. Of course, if desirable or necessary, an external heat source or sources could be used to maintain the dissolving tank or other processing units in the desired temperature ranges. Insoluble materials (i.e., the dregs) from the green liquor clarifier, after appropriate processing, are generally landfilled in an environmentally acceptable manner. The clarified green liquor is then treated with lime to regenerate the pulping chemicals for reuse in the kraft pulping process.

Using the FIGURE, a preferred embodiment of the present invention, using waste steam as the fluidizing gas, will now be described along with associated processing steps and processing units. Molten kraft smelt from a black liquor recovery system is introduced into a fluidized bed reactor or fluid bed solidifier 10 via feed line or conduit 12. Conduit 12 may be any suitable transporting means including, for example, a water-cooled tough or, more preferably, a ceramic or ceramic-lined line. The molten kraft smelt can be fed into the fluidized bed reactor 10 via a single feed line 12 or via multiple feed lines (not shown). As those skilled in the art will realize, due to molten kraft smelt's corrosive nature, contact with metal components should generally be avoided. A sufficient hydrostatic head of smelt in the feed line 12 should be maintained so that the fluidizing gas will not enter the feed line. Thus, conduit 12 is preferably fitted with a hydraulic trap or other device (not shown) to seal or help prevent the fluidizing gas from entering or backing up into the black liquor recovery system. Preferably, conduit 12 allows the molten kraft smelt to be gravity fed into the fluidized bed solidifier 10. The fluidized bed solidifier 10 has a particulate substrate or bed material which is maintained in a fluidized state therein by the preferred waste steam fluidizing gas introduced into the bottom of the fluid bed solidifier 10 through line 14. Preferably, the waste steam is evenly distributed in the fluidized bed reactor 10 via a gas distribution plate or system 15. Line 16 is used to introduce the initial particulate substrate into the fluidized bed reactor during start up. (Line 16 could also be used to add solid kraft smelt which may be collected while the fluidized bed reactor 10 is shut down for maintenance or repairs.) Preferably the initial substrate bed is ground up solid kraft smelt.

Solid kraft smelt particles are removed from the lower portion, preferably the bottom or close to the bottom, of the fluidized bed reactor 10 via line 30 and conveyed directly (or through a holding tank; not shown) to the dissolving tank 32 using, for example, a rotary star valve or other conventional solid handling equipment (not shown). If desired, solid kraft smelt particles from the fluidized bed reactor 10 can be fed to a plurality of dissolving tanks (not shown). Alternatively, a single dissolving tank could be fed from a plurality of fluidized bed reactors (not shown). The dissolving tank 32 contains an aqueous solution for dissolving the solid kraft smelt. This aqueous solution is generally derived from weak wash from the mud washer 50 via line 54, high sulfidity green liquor from scrubber 20 via lines 24 and 26, and/or any make-up process water (not shown) that may be required.

The use of solid kraft smelt in the smelt dissolving tank 32 offers several advantages over conventional dissolving tank processes. First, there is no direct water/molten kraft smelt contact, thereby essentially eliminating the risk of explosions. Second, the concentration of the green liquor can be controlled to a much higher degree when feeding solid kraft smelt as compared to molten kraft smelt since it is much easier to handle, control, and dispense solids than it is an extremely hot, extremely corrosive molten material. The improved control of the green liquor concentration afforded by the present invention allows significantly better control and optimization of downstream processing steps. For example, a steady carbonate concentration in the green liquor should improve slaking and causticizing efficiencies and decrease carbonate deadload in the white liquor. A deadload chemical is a non-pulping chemical present in the white liquor. Such deadload materials, which generally decrease pulping rates and energy efficiencies, can build up over time and, in some cases, limit the useful lifetimes of the pulping chemicals. Thus, decreasing deadload can improve rates, energy efficiencies, and total number of possible recycles. Third, by feeding the solid smelt well below the liquid level in the dissolving tank 32, any steam or sulfur-containing volatile compounds (i.e., hydrogen sulfide, mercaptans, and the like) which are liberated as the hot solid smelt contacts the aqueous solution can be recondensed and reabsorbed in the green liquor solution before escaping from the green liquor solution. Thus, the amount of pollutants released from the dissolving tank is substantially reduced when compared with conventional dissolving tanks where molten kraft smelt is added directly to the aqueous solution. In other words, the hydrogen sulfide plume, normally associated with conventional dissolving tanks fed with molten kraft smelt, is essentially eliminated in the present invention. Thus, it is generally preferred that the solid kraft particles are feed into, or close to, the lower portion (i.e., near the bottom) of the dissolving tank 32.

Green liquor from the dissolving tank 32 is removed via line 34 and transported to the green liquor clarifier 36 where insoluble materials are removed, preferably by settling or flocculation techniques. It has also been found that the settling rate of the dregs from steam-treated kraft smelt (i.e., when waste steam is used as the fluidizing gas in the fluidized bed reactor 10) is about 2 to 3 times higher than the normal dregs settling rate in a conventional black liquor recovery system. This increased settling rate can be especially helpful for a paper-making mill having problems with green liquor clarity. Moreover, the increased settling rate can allow for reduced usage of polymeric or other settling aids in the green liquor clarifier 36 as well as for faster throughput. The insoluble materials or dregs are removed via line 42 to dregs filter 44. The dregs are removed via line 46 and normally landfilled in an environmentally acceptable manner. Generally the amount of dregs required to be landfilled is reduced in the present invention. The reduction in dregs is even more significant when waste steam is used as the fluidizing gas because the waste steam gasifies at least a portion char carbon contained in the dregs component of the kraft smelt during the cooling and solidifying step. Using waste steam as the fluidizing gas, dregs flow can be reduced by as much as an estimated 40 percent, thereby significantly reducing landfill costs and usage. Where the dregs contain significant amounts of initial fluidizing bed material other than ground up kraft smelt (e.g., sand used to start up the fluidized bed), the dregs, if desired, can be stockpiled for use during later start up operations. Then, as the amount of purged inert solids decreases, the dregs could be redirected to the appropriate landfill. Of course, using ground up solid kraft smelt as the initial fluidized bed material is preferred since essentially the entire substrate bed (except the dregs coming in with the kraft smelt) is converted to green liquor.

Clarified green liquor is removed from the green liquor clarifier 36 via line 38. The clarified green liquor is then treated with lime (not shown) to generate a white liquor through the conventional slaking and causticizing reactions. The white liquor is then clarified by removing the insoluble materials (i.e., the lime mud). The clarified white liquor, which contains the regenerated pulping chemicals, is then recycled in the kraft pulping process. The lime mud from the white liquor clarifier is returned via line 56 to the mud washer 50 where it is washed with filtrate via line 48 from dregs filer 44 and, as necessary, additional wash water via line 52. The washed lime mud is transported to a kiln (not shown) to regenerate lime for use in converting the clarified green liquor into white liquor. The supernatant or weak wash from the mud washer 50 can be directed via line 54 to the dissolving tank 32 for use in making additional green liquor.

The overheads (containing the fluidizing gas and volatile components from the kraft smelt) are removed from the fluid bed solidifier 10 via line 18 and are contacted in scrubber 20 with clarified green liquor from the green liquor clarifier 36 via lines 38 and 40 and, if desired, other process water (not shown) in order to remove hydrogen sulfide or other reduced sulfur compounds (i.e., mercaptans) that might be present in the overheads. If desired, an appropriate solids filter or cyclone (not shown) could be incorporated into line 18 to remove entrained solids (if any) from the gas stream. The resulting sulfur-containing aqueous solution from scrubber 20 (which is a high sulfidity green liquor if green liquor is used in scrubber 20) is removed via line 24. This aqueous solution can be recycled to the dissolving tank 32 via lines 24 and 26) and/or added to the clarified green liquor via lines 24 and 28 to be converted to white liquor and/or treated separately via line 24 as a high sulfidity green liquor which can be converted to a white liquor containing a higher concentration of sulfur-containing pulping chemicals. Of course, as one skilled in the art will realize, the treatment of the aqueous solution from scrubber 20 can be varied as required by the operating requirements of the paper mill. The gaseous component from the scrubber 20 is removed via line 22 and can, if desired and if waste steam was used as the fluidizing gas, be used as superheated steam for use throughout the paper mill. Eventually, such superheated steam, once useful work has been extracted, may be recycled via line 14 back to the fluid bed solidifier 10 as waste steam. Other fluidizing gases, if used, can be removed via line 22 and, after extraction of useful heat values, recycled to the fluid bed solidifier 10 via line 14.

In operation, it is generally preferred that the temperature of the molten kraft smelt fed via line 12 is in the range of about 1350° to 1550° F., and more preferably about 1500° to 1550° F.; that the temperature of the fluid bed reactor 10 is in the range of about 600° to 900° F., and more preferably about 600° to 750° F.; that the temperature of the dissolving tank 32 is in the range of about 180° to 205° F., and more preferably at about 190° to 200° F.; and that the temperature of the green liquor clarifier is in the range of about 180° to 200° F., and more preferably at about 190° F. It is even more preferable that the temperature of the molten kraft smelt fed via line 12 is about 1500° F.; that the temperature of the fluid bed reactor 10 is about 700° F.; that the temperature of the dissolving tank 32 is about 200° F.; and that the temperature of the green liquor clarifier is about 190° F. Preferably, the process of this invention, including that illustrated in the FIGURE, is operated such that temperature of each proceeding unit, as that material is carried forward, maintains or at least helps maintain the desired operating temperature in the next unit so as to maximize operating efficiencies. Of course, external heating sources can be used if desired or necessary. For example, if the dissolving tank was required to be shut down for maintenance, the solid kraft smelt particles from the fluid bed reactor 10 could be stockpiled (and allowed to cool below the preferred temperature ranges). Once the dissolving tank could be returned to service, the stockpiled solid kraft smelt particles could be added to the dissolving tank maintained at the preferred temperature by external heat sources. Or the stockpiled solid kraft smelt particles could be reheated to the desired temperature range (e.g., by passage through the fluid bed reactor 10 either during start up or during continuous operation of the fluid bed reactor). Or the stockpiled solid kraft smelt particles could be blended with high temperature solid kraft smelt particles directly from the fluid bed reactor 10.

As one skilled in the art will realize, other combinations of units or other arrangements of such units can be used to form an integrated process using the present invention other than the units and arrangements shown in the FIGURE. Such other combinations of units and/or arrangements should, at a minimum, provide for cooling and solidifying molten kraft smelt in a fluidized bed and for converting the cooled and solidified kraft smelt so produced into a green liquor.

That which is claimed is:

1. A process for treatment of molten kraft smelt in a kraft recovery process, said process comprising (1) feeding molten kraft smelt from a black liquor recovery system to a fluidized bed reactor containing particulate solids fluidized with a non-oxidizing fluidizing gas, wherein the fluidized bed reactor is operated at a temperature of about 600° to 900° F.;

(2) solidifying the molten kraft smelt within the fluidized bed reactor to form solid kraft smelt particles;

(3) removing the solid kraft smelt particles from the fluidized bed reactor; and (4) feeding the solid kraft smelt particles to a dissolving tank containing an aqueous solution whereby a kraft green liquor is formed.

2. A process as defined in claim 1, wherein the molten kraft smelt is fed into the central portion of the fluidized bed reactor and the solid kraft smelt particles are removed from the lower portion of the fluidized bed reactor.

3. A process as defined in claim 1, wherein the molten kraft smelt is fed into the fluidized bed reactor by gravity via a ceramic supply line.

4. A process as defined in claim 1, wherein the particulate solids used to start up the fluidized bed reactor are selected from the group consisting of sand, water insoluble salts, and ground-up solid kraft smelt.

5. A process as defined in claim 1, wherein the particulate solids used to start up the fluidized bed reactor are ground-up solid kraft smelt.

6. A process as defined in claim 1, wherein the non-oxidizing fluidizing gas is steam which is essentially oxygen free.

7. A process as defined in claim 1, wherein the molten kraft smelt is fed into the central portion of the fluidized bed reactor by gravity via a ceramic supply line, wherein the solid kraft smelt particles are removed from the lower portion of the fluidized bed reactor, wherein the particulate solids used to start up the fluidized bed reactor are ground-up solid kraft smelt, and wherein the non-oxidizing fluidizing gas is steam which is essentially oxygen free.

8. A process as defined in claim 7, wherein the solid kraft smelt particles are fed into the dissolving tank sufficiently below the surface of the aqueous solution so that essentially all the volatile, sulfur-containing materials which are thereby liberated are recondensed and reabsorbed in the aqueous solution.

9. A process as defined in claim 8, wherein the solid kraft smelt particles removed from the fluidized bed reactor and fed into the dissolving tank are at a temperature of about 600° to 750° F. whereby the temperature of the aqueous solution in the dissolving tank is maintained at a temperature of about 180° to 205° F.

10. A process as defined in claim 1, wherein the solid kraft smelt particles are fed into the dissolving tank sufficiently below the surface of the aqueous solution so that essentially all the volatile, sulfur-containing materials which are thereby liberated are recondensed and reabsorbed in the aqueous solution.

11. A process as defined in claim 1, wherein the solid kraft smelt particles removed from the fluidized bed reactor and fed into the dissolving tank are at a temperature of about 600° to 750° F. whereby the temperature of the aqueous solution in the dissolving tank is maintained at a temperature of about 180° to 205° F.

12. A continuous process for treatment of molten kraft smelt in a kraft recovery process, said process comprising (1) continuous feeding molten kraft smelt from a black liquor recovery system to a fluidized bed reactor containing particulate solids fluidized with a non-oxidizing fluidizing gas, wherein the fluidized bed reactor is operated at a temperature of about 600° to 900° F.;

(2) solidifying the molten kraft smelt within the fluidized bed reactor to form solid kraft smelt particles;

(3) removing the solid kraft smelt particles from the lower portion of the fluidized bed reactor; and (4) feeding the solid kraft smelt particles removed from the fluidized bed reactor to a dissolving tank containing an aqueous solution whereby a kraft green liquor is formed, wherein the solid smelt particles are introduced sufficiently below the surface of the aqueous solution so that essentially all gaseous sulfur-containing compounds liberated upon introduction of the solid smelt particles are absorbed in the aqueous solution;

wherein the relative rates of molten kraft smelt fed into the fluidized reactor and solid kraft smelt particles removed from the fluidized bed reactor are adjusted to achieve an essentially steady state operation.

13. A continuous process as defined in claim 12, wherein the molten kraft smelt is fed into the fluidized bed reactor by gravity via a ceramic supply line from the black liquor recovery system and wherein the non-oxidizing fluidizing gas is essentially oxygen-free steam.

14. A continuous process as defined in claim 13, wherein the particulate solids used to start up the fluidized bed reactor are ground-up solid kraft smelt.

15. A continuous process as defined in claim 14, wherein the solid kraft smelt particles removed from the fluidized bed reactor and fed into the dissolving tank are at a temperature of about 600° to 750° F. whereby the temperature of the aqueous solution in the dissolving tank is maintained at a temperature of about 180° to 205° F.

16. A continuous process as defined in claim 13, wherein the solid kraft smelt particles removed from the fluidized bed reactor and fed into the dissolving tank are at a temperature of about 600° to 750° F. whereby the temperature of the aqueous solution in the dissolving tank is maintained at a temperature of about 180° to 205° F.

17. A continuous process as defined in claim 13, wherein the fluidizing gas exiting the fluidized bed reactor is used as superheated steam.

18. A continuous process as defined in claim 12, wherein the particulate solids used to start up the fluidized bed reactor are selected from the group consisting of sand, water insoluble salts, and ground-up solid kraft smelt.

19. A continuous process as defined in claim 12, wherein the solid kraft smelt particles removed from the fluidized bed reactor and fed into the dissolving tank are at a temperature of about 600° to 750° F. whereby the temperature of the aqueous solution in the dissolving tank is maintained at a temperature of about 180° to 205° F.

20. An integrated process for the recovery of pulping chemicals from black liquor from a kraft pulping mill, said process comprising (1) burning black liquor from a kraft pulping mill in a boiler to produce high pressure steam;

(2) collecting molten kraft smelt from the bottom of the boiler;

(3) feeding the molten kraft smelt into a fluidized bed reactor containing a particulate substrate fluidized with a non-oxidizing fluidizing gas and operated at a temperature at least 100° F. below the melting point of the molten kraft smelt, whereby the molten kraft smelt cools and solidifies upon contact with the fluidized particulate substrate to form solid kraft smelt particles;

(4) removing the solid kraft smelt particles from the fluidized bed reactor;

(5) feeding the solid kraft smelt particles to a dissolving tank containing an aqueous solution at about 180° to 205° F. to form a kraft green liquor, wherein the solid kraft smelt particles are fed at a sufficient depth below the surface of the aqueous solution so that steam and volatile sulfur-containing compounds are recondensed and reabsorbed in the aqueous solution;

(6) clarifying the kraft green liquor by removing dregs; and (7) treating the clarified kraft green liquor with lime to form a kraft white liquor containing the pulping chemicals.

21. An integrated process as defined in claim 20, wherein the fluidizing gas is low-grade steam which is essentially oxygen free, wherein off-gases from the fluidized bed reactor are treated in a scrubber to remove sulfur-containing compounds, and wherein the treated off-gases are used as superheated steam.

22. An integrated process as defined in claim 21, wherein the molten kraft smelt fed into the fluidized bed reactor is about 1350° to 1550° F., wherein the fluidized bed reactor is operated at about 600° to 900° F., wherein the dissolving tank is operated at about 180° to 205° F., and wherein the green liquor is clarified at about 180° to 200° F.

23. An integrated process as defined in claim 22, wherein the molten kraft smelt fed into the fluidized bed reactor is about 1400° to 1500° F., wherein the fluidized bed reactor is operated at about 600° to 750° F., wherein the dissolving tank is operated at about 190° to 200° F., and wherein the green liquor is clarified at about 180° to 200° F.

24. An integrated process as defined in claim 22, wherein the relative rates of molten kraft smelt fed into the fluidized reactor and solid kraft smelt particles removed from the fluidized bed reactor are adjusted to achieve an essentially steady state operation, and wherein the particulate substrate used to start up the fluidized bed reactor is ground up solid kraft smelt.

25. An integrated process as defined in claim 21, wherein the relative rates of molten kraft smelt fed into the fluidized reactor and solid kraft smelt particles removed from the fluidized bed reactor are adjusted to achieve an essentially steady state operation, and wherein the particulate substrate used to start up the fluidized bed reactor is ground up solid kraft smelt.

26. An integrated process as defined in claim 20, wherein the relative rates of molten kraft smelt fed into the fluidized reactor and solid kraft smelt particles removed from the fluidized bed reactor are adjusted to achieve an essentially steady state operation, and wherein the particulate substrate used to start up the fluidized bed reactor is ground up solid kraft smelt.

* * * * *